May 15, 1923.
Y. HONDA
STOP AND TURN SIGNAL
Filed July 26, 1922
1,455,001
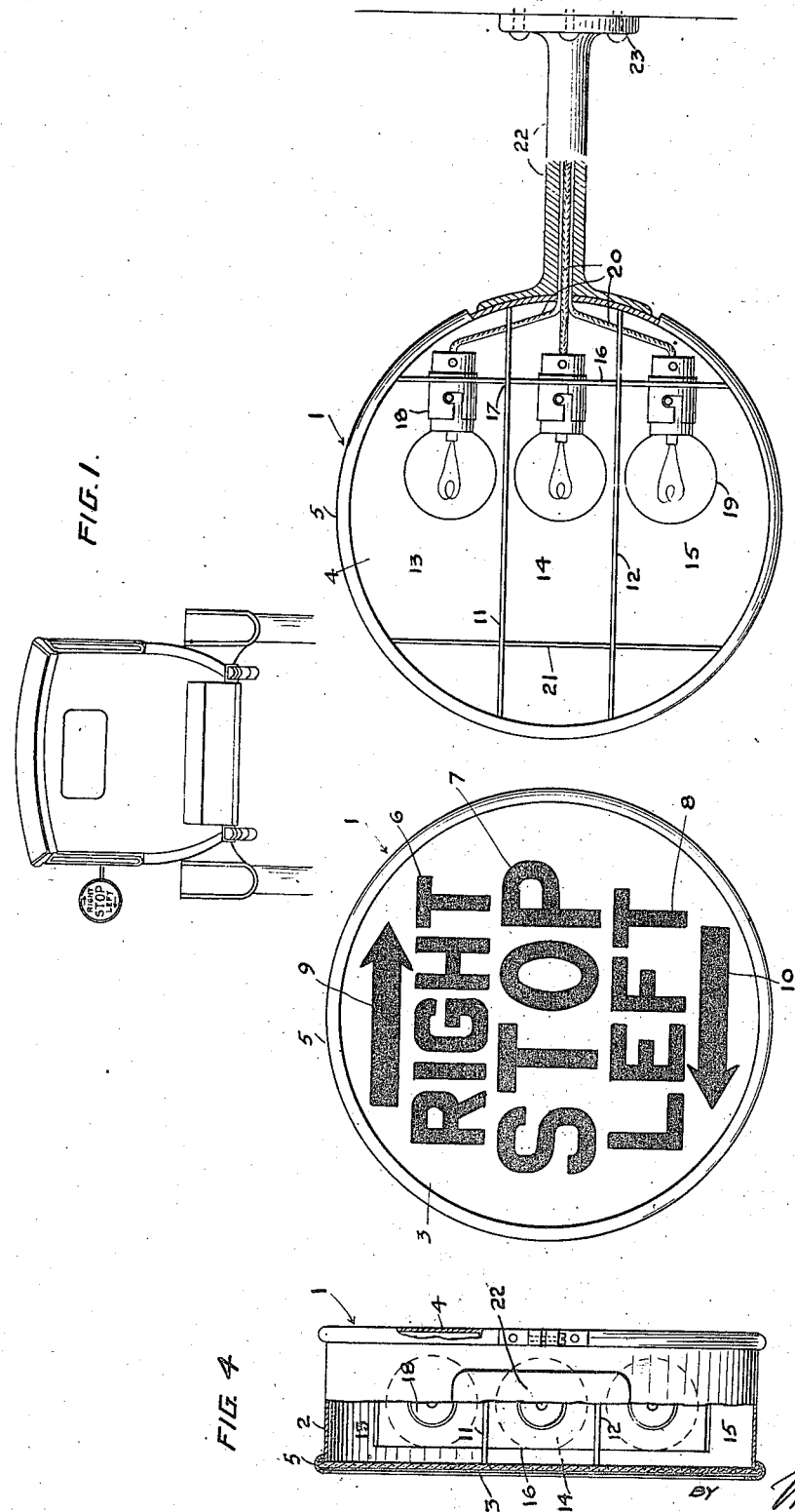
INVENTOR
Y. HONDA Patented May 15, 1923.

1,455,001

UNITED STATES PATENT OFFICE.

YAKICHI HONDA, OF FOWLER, CALIFORNIA.

STOP AND TURN SIGNAL.

Application filed July 26, 1922. Serial No. 577,534.

*To all whom it may concern:*

Be it known that I, YAKICHI HONDA, a subject of the Emperor of Japan, residing at Fowler, in the county of Fresno and State of California, have invented new and useful Improvements in Stop and Turn Signals, of which the following is a specification.

This invention relates to improvements in stop and turn signals for motor vehicles and has particular reference to a simple, inexpensive, compact and efficient device of this nature which is arranged so that it may be attached to an automobile in such manner that it will be clearly visible to approaching and following vehicles, whereby the intended movements of the driver of the vehicle may be readily determined.

An object of the invention is to provide a stop and turn signal which consists of but few parts and is capable of being readily attached to any make of motor vehicle without necessitating the changing of the construction of the latter, the signal being so arranged that it will be plainly visible both by day and night, and of such an arrangement as to positively attract attention of following and approaching vehicles so as to clearly indicate the intended movements of the driver.

Another object of the invention is to provide a stop and turn signal of the character described which through a novel arrangement of partitions and signaling elements has maximum efficiency as an indicator; there being on opposite sides of the body of the signal, stop and turn glass lens bearing signaling designations and forming with the partitions, compartments in each of which illuminating means is provided, the signaling member preferably comprising cylindrical casing segments or parts of the lenses, which are illuminated during the operation of the device.

The invention possesses other advantages and features some of which with the foregoing will be set forth at length in the following description where I shall outline in full that form of the invention which I have selected for illustration in the drawings accompanying and forming a part of the present specification. In said drawings I have shown one form of the construction of my invention, but it is to be understood that I do not limit myself to such form since the invention as expressed in the claims may be embodied in a plurality of forms.

Referring to the drawing:

Fig. 1 represents a rear elevation of the motor vehicle showing the signal of my invention attached to and extending outwardly from one side thereof.

Fig. 2 represents a rear elevation of the signal with the lens or glass side walls removed.

Fig. 3 represents a front elevation of the signal.

Fig. 4 represents a side elevation of the signal partly broken away and showing the interior arrangement.

Referring to the embodiment of the invention illustrated in the accompanying drawing, the signal comprises a cylindrical casing 1, having a metallic annular wall 2 to opposite sides of which, glass lenses or walls 3 and 4 are attached. These walls or lenses 3 and 4 are secured to the margins of the wall 2 by attaching rings or members 5 of any suitable arrangement and each wall has painted or otherwise caused to appear thereon, the words "Right," "Stop," and "Left," as shown at 6, 7 and 8, in Fig. 3. The word "Right" is arranged so as to extend transversely across the upper portions of the members 3 and 4, the word "Stop" in the center, and the word "Left" at the lower portion of said lens. Immediately above the designation "Right" is the representation of an arrow, as shown at 9, and a similar representation 10, is provided beneath the designation "Left," said arrows pointing to the right and left sides of the vehicle respectively. The representations 6, 7, 8, 9, and 10 may be caused to appear in dark or light colors, but preferably the former, and the lenses 3 and 4 are preferably translucent, for example, a light shade of red or pink, whereas the letters will be a darker shade of the same or a different color, or again, the lenses 3 and 4 may be of the dark color but translucent, while the letters light in color, or the lenses are so darkened as to form the letters on the plain glass. Any suitable arrangement may be employed provided that the segments or portions of the lenses are illuminated as well as the letters.

Mounted within the casing 1 are spaced horizontal partition members 11 and 12, the ends of which abut the annular wall 2, whereas the longitudinal edges of each engage closely with the lenses 3 and 4 and thereby provide compartments 13, 14 and 15, of which compartments the lenses 3 and 4 comprise the side walls. The compartments 13 and 15 are segmental and of equal size, whereas the compartment 14 is of substantially rectilinear outline. The designations 6 and 9 are opposite the compartment 13, the designation 7 opposite the compartment 14, and the designations 8 and 10 opposite the compartment 15. Extending at right angles to the partitions 11 and 12 is a bracing electric lamp supporting member 16, the ends of which engage the circular wall 2 adjacent the upper and lower sides of the wall. The member 16 extends through slots 17 provided in the partitions 11 and 12 at points spaced from certain ends of said partitions and along its longitudinal edge is spaced inwardly from the lenses 3 and 4. A plurality of electric lamp sockets 18 are supported by the member 16 in the respective compartments and contain electric light bulbs 19. The sockets are electrically connected with a source of electrical energy, not shown, by means of the usual conductors 20. The sockets and lamps are so arranged as to be substantially centrally disposed in the respective compartments. By having the longitudinal edges of the member 16 spaced considerably from the lenses 3 and 4, light rays from the lamps will be permitted to illuminate the portions of the lenses rearwardly or to the right of the member 16 so that the entire portions of the lenses which are illuminated are symmetrical and of pleasing appearance. A member 21, similar to the member 16, is extended through similar openings in the partitions 11 and 12 adjacent the other ends of the partitions and abuts the wall 2 at its ends. The longitudinal edges of this member are likewise spaced from the lenses 3 and 4. The member 21 serves as a brace and provides for uniformity of the construction of the interior of the signal. Thus the interior of the signal may be removed as a unit from the signal casing and due to the engagement of the four members, that is the partitions 11 and 12, and members 16 and 21, at the ends of said partitions and members, with the wall 2, the interior mechanism will be rigidly but removably held within the casing.

Any suitable means, not shown, may be employed to control the operation of the signal which, as is customary, will be located so as to be accessible to the driver of the vehicle.

As a means of attachment, an arm 22 is attached to the side of the circular wall 2 of the casing and upon its inner end is provided with means 23 to permit of its attachment to the stanchions of an automobile wind shield, or other suitable part of the automobile.

It will be seen that with the simple, inexpensive signal of my invention arranged so as to be visible from in front and in the rear of the vehicle to which it is attached, a positive and highly effective signaling of the contemplated movement of the driver of the vehicle may be reliably and easily effected.

I claim:

1. A stop and turn signal comprising a circular casing, glass lenses comprising the side walls of the casing and having stop and turn designations appearing thereon, partitions dividing the interior of the casing into compartments opposite which compartments the said designations are arranged, said partitions engaging along their longitudinal edges the lenses, a member for supporting illuminating means extending at right-angles to and through said partitions and having its longitudinal edges spaced from the lenses and means of illumination supported by said member within the respective compartments.

2. A stop and turn signal comprising a circular casing, glass lenses comprising the side walls of the casing and having stop and turn designations appearing thereon, partitions dividing the interior of the casing into compartments opposite which compartments the said designations are arranged, said partitions engaging along their longitudinal edges the lenses, a member for supporting illuminating means extending at right-angles to and through said partitions and having its longitudinal edges spaced from the lenses, means of illumination supported by said member within the respective compartments and a brace member extending at right angles to and through said partitions at ends thereof opposite to the member for supporting the illuminating means.

3. A stop and turn signal for motor vehicles comprising a circular casing having glass lenses closing opposite sides thereof, longitudinal partitions dividing the casing into compartments, said lenses having stop and turn designations appearing thereon opposite the respective compartments, the longitudinal edges of the partitions engaging opposed faces of said lenses and members extending at right-angles to and through said partitions with their ends abutting the circular and annular wall of the casing and located at points spaced inwardly from the ends of the partitions, said members having their longitudinal edges spaced from the opposed faces of the lenses and means of illumination supported by one of said members and located within the respective compartments.

4. A stop and turn signal for motor vehicles comprising a circular casing having glass lenses closing opposite sides thereof, longitudinal partitions dividing the casing into compartments, said lenses having stop and turn designations appearing thereon opposite the respective compartments, the longitudinal edges of the partitions engaging opposed faces of said lenses and a member extending at right angles to and through said partitions with its ends abutting the circular and annular wall of the casing and located at points spaced inwardly from the end of the partitions, said member having its longitudinal edges spaced from the opposed faces of the lenses and means of illumination supported by said member and located within the respective compartments.

YAKICHI HONDA.